United States Patent [19]
Burdette, Jr.

[11] Patent Number: 5,205,603
[45] Date of Patent: Apr. 27, 1993

[54] TRUCK TAILGATE LADDER APPARATUS

[76] Inventor: Orin F. Burdette, Jr., 102 Mulberry La., Harbeson, Del. 19951

[21] Appl. No.: 840,168

[22] Filed: Feb. 24, 1992

[51] Int. Cl.$^5$ ............................................. B60R 3/02
[52] U.S. Cl. ..................................... 296/62; 280/166; 182/195
[58] Field of Search ........................ 296/62; 280/166; 414/537; 182/195

[56] References Cited

U.S. PATENT DOCUMENTS

| | | | |
|---|---|---|---|
| 3,853,369 | 12/1974 | Holden | 296/62 |
| 3,889,997 | 6/1975 | Schoneck | 296/62 |
| 4,191,388 | 3/1980 | Barksdale | 280/166 |
| 4,795,304 | 1/1989 | Dudley | 414/537 |
| 4,846,487 | 7/1989 | Criley | 280/166 |
| 4,848,821 | 7/1989 | Llewellyn | 296/62 |
| 4,923,360 | 5/1990 | Blanchemin | 414/537 |
| 5,028,063 | 7/1991 | Andrews | 280/166 |

*Primary Examiner*—Robert R. Song
*Attorney, Agent, or Firm*—Leon Gilden

[57] ABSTRACT

A ladder assembly is mounted slidably and telescopingly within a tailgate portion of a truck bed to include a respective first and second ladder member extensibly mounted relative to the tailgate, and more specifically to a cavity therewithin, to provide ease of access to interiorly of the truck bed, with a handrail in operative association with the truck bed and tailgate for stability in use of the ladder organization.

7 Claims, 5 Drawing Sheets

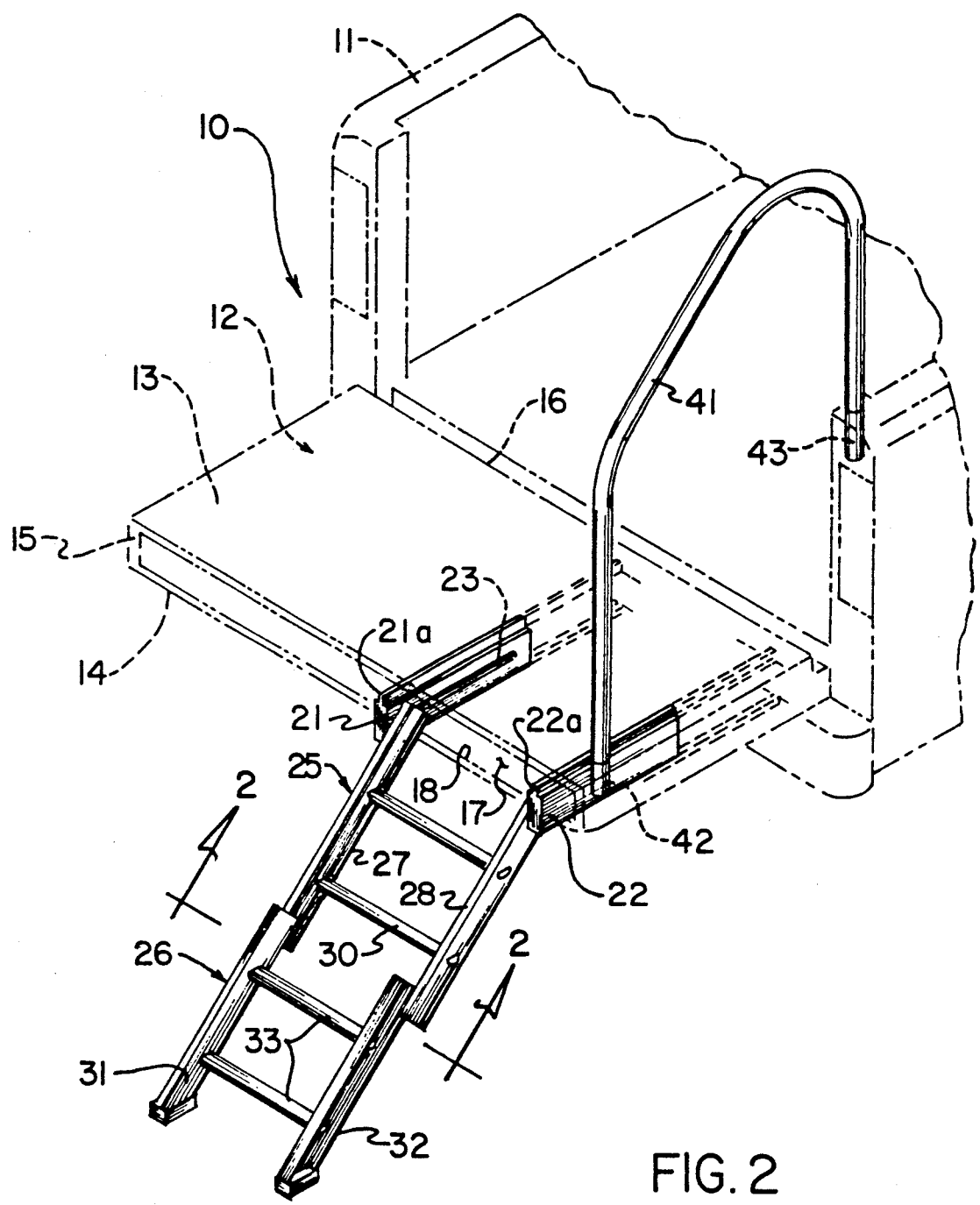
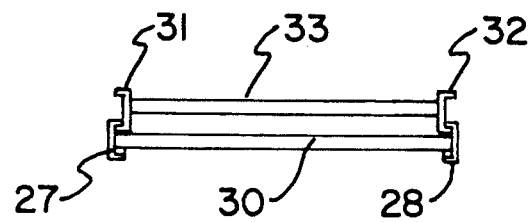

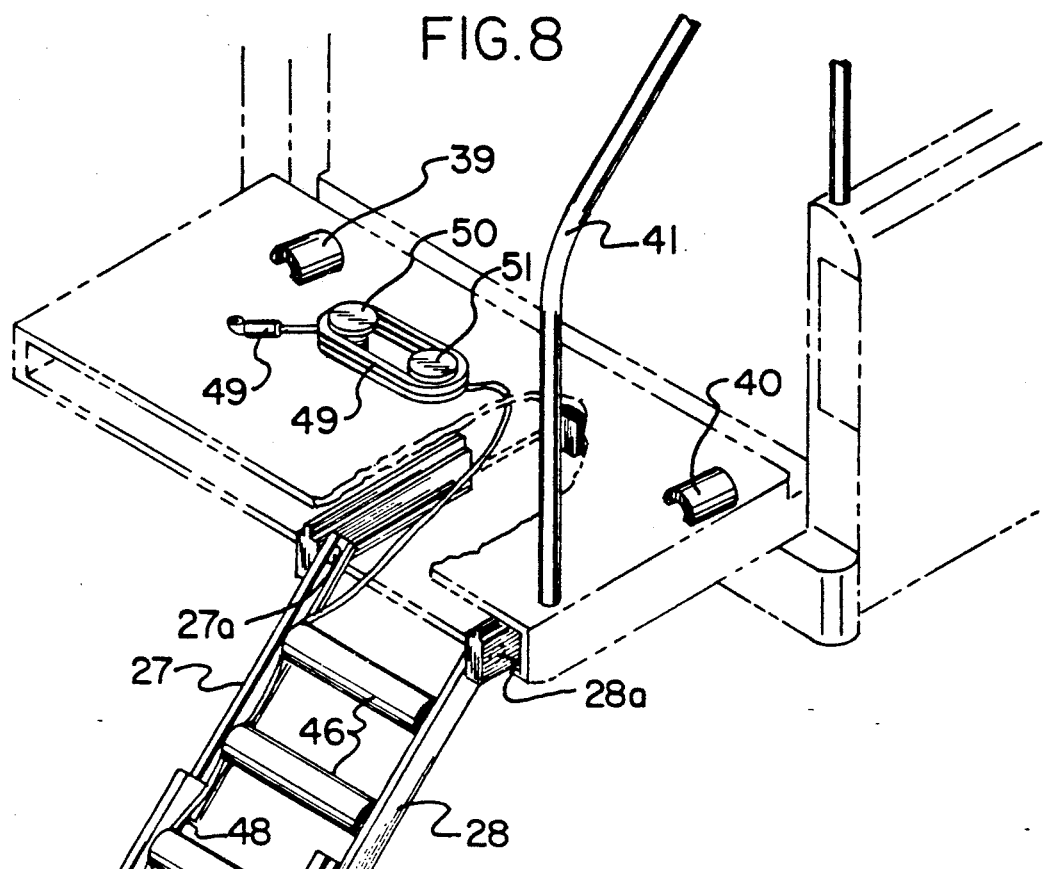
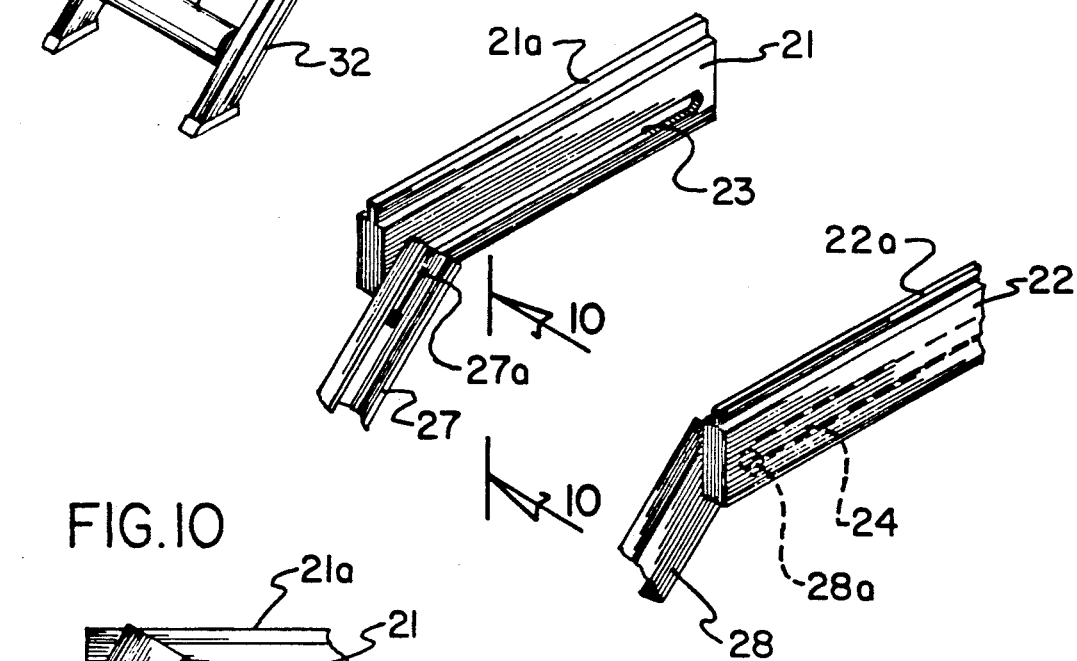
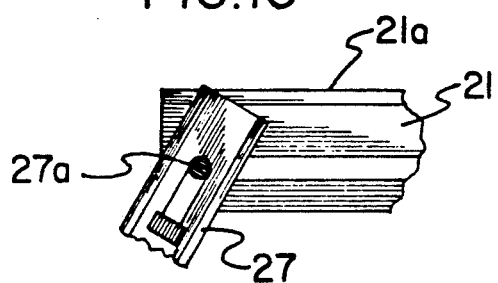

TRUCK TAILGATE LADDER APPARATUS

BACKGROUND OF THE INVENTION

1. Field of the Invention

The field of invention relates to truck tailgate apparatus, and more particularly pertains to a new and improved truck tailgate ladder apparatus wherein the same is arranged to provide for a tailgate assembly extensibly mounted relative to a tailgate of an associated self-propelled vehicle.

2. Description of the Prior Art

Various tailgate structure associated with trucks has been utilized in the prior art for ease of manipulation of various workloads and individuals relative to the truck organization. Such apparatus is exemplified in U.S. Pat. No. 4,898,510 to Weber wherein a lifting and swiveling device is mounted to a tailgate of a truck for the manipulation of various workloads relative to the tailgate of the truck.

U.S. Pat. No. 4,846,487 to Criley sets forth a tailgate step pivotally mounted relative to an interior surface of the tailgate and arranged in a retractable relationship relative to the tailgate for use as a step organization for loading of passengers.

The U.S. Pat. No. 3,853,369 to Holden, as well as U.S. Pat. No. 4,848,821 to Llewellyn set forth ladder structures arranged for pivotal mounting relative to tailgate organizations, but are mounted externally relative to the tailgate structure.

U.S. Pat. No. 4,923,360 to Beauchemin sets forth a tailgate ramp arranged for extension and retraction relative to the interior surface of the tailgate of the truck set forth in the patent.

As such, it may be appreciated that there continues to be a need for a new and improved truck tailgate ladder apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of truck tailgate apparatus now present in the prior art, the present invention provides a truck tailgate ladder apparatus wherein the same is arranged for the extension and retraction of a tailgate structure interiorly of a tailgate of an associated pickup truck. As such, the general purpose of the present invention, which will be described subsequently in greater detail, is to provide a new and improved truck tailgate ladder apparatus which has all the advantages of the prior art truck tailgate apparatus and none of the disadvantages.

To attain this, the present invention provides a ladder assembly mounted slidably and telescopingly within a tailgate portion of a truck bed to include a respective first and second ladder member extensibly mounted relative to the tailgate, and more specifically to a cavity therewithin, to provide ease of access to interiorly of the truck bed, with a handrail in operative association with the truck bed and tailgate for stability in use of the ladder organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck tailgate ladder apparatus which has all the advantages of the prior art truck tailgate apparatus and none of the disadvantages.

It is another object of the present invention to provide a new and improved truck tailgate ladder apparatus which may be easily and efficiently manufactured and marketed.

It is a further object of the present invention to provide a new and improved truck tailgate ladder apparatus which is of a durable and reliable construction.

An even further object of the present invention is to provide a new and improved truck tailgate ladder apparatus which is susceptible of a low cost of manufacture with regard to both materials and labor, and which accordingly is then susceptible of low prices of sale to the consuming public, thereby making such truck tailgate ladder apparatus economically available to the buying public.

Still yet another object of the present invention is to provide a new and improved truck tailgate ladder apparatus which provides in the apparatuses and methods of the prior art some of the advantages thereof, while simulataneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view, taken along the lines 2—2 of FIG. 1 in the direction indicated by the arrows.

FIG. 8 is an isometric illustration of a modification of the invention illustrating pneumatic steps utilized by the invention.

FIG. 9 is an isometric illustration of the first ladder member extended relative to the runner plates.

FIG. 10 is an orthographic view, taken along the lines 10—10 of FIG. 9 in the direction indicated by the arrows.

DESCRIPTION OF THE PREFERRED EMBODIMENT

Figure 3:
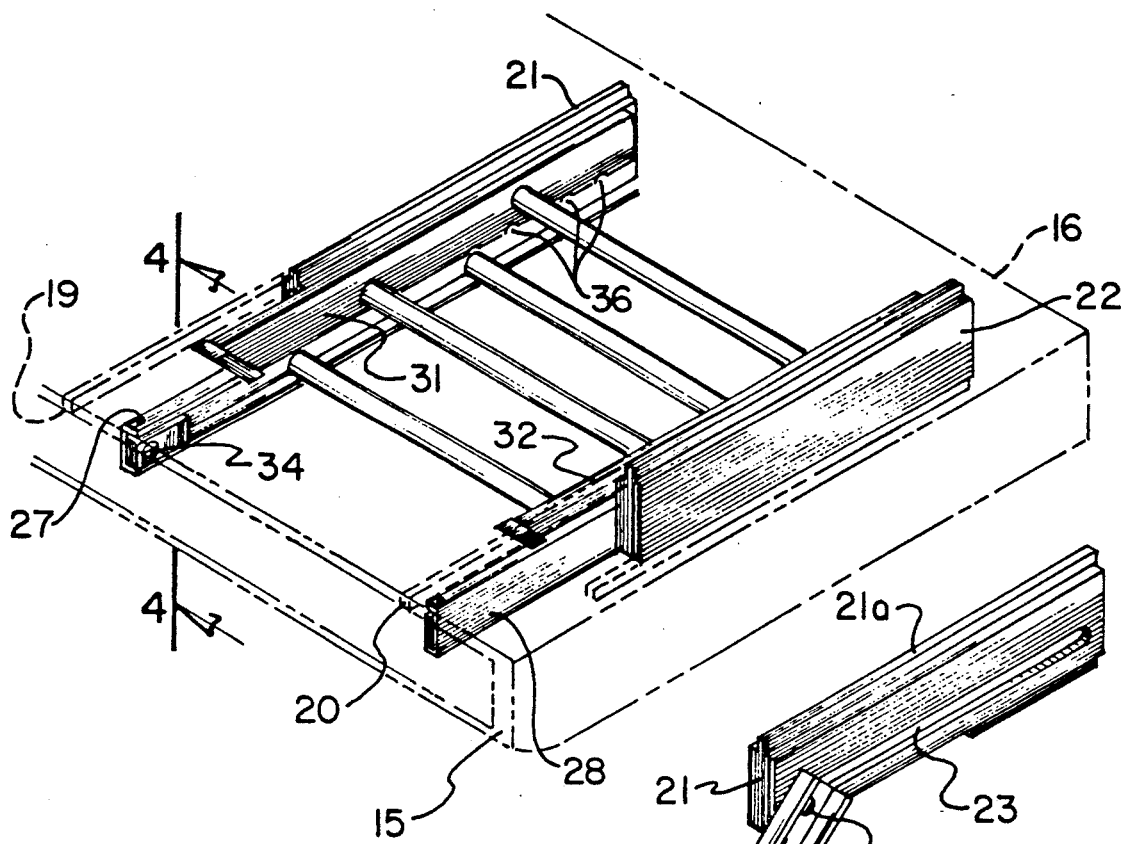
FIG. 3 is an isometric illustration of the invention in a folded relationship interiorly of the truck tailgate.
Figure 5:
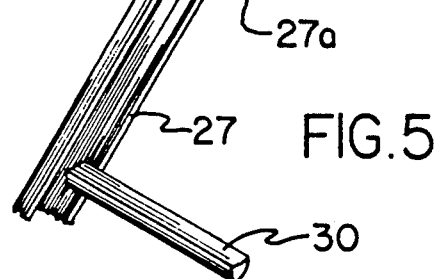
FIG. 5 is a partial isometric illustration of the invention arranged to illustrate the pivotal relationship of the first ladder member relative to the spaced runner plates that in turn are slidably mounted within the tailgate of the invention.
Figure 4:
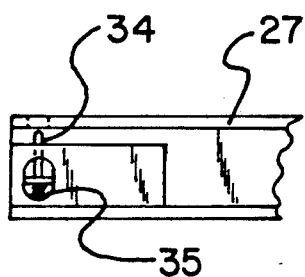
FIG. 4 is an orthographic view, taken along the lines 4—4 of FIG. 3 in the direction indicated by the arrows.

With reference now to the drawings, and in particular to FIGS. 1 to 11 thereof, a new and improved truck tailgate ladder apparatus embodying the principles and concepts of the present invention and generally designated by the reference numeral 10 will be described.

More specifically, the truck tailgate ladder apparatus 10 of the instant invention essentially comprises the organization in combination with a truck bed 11 of conventional construction, utilizing a tailgate 12 pivotally mounted to the truck bed 11 about a bottom wall 16 of the tailgate 12. The tailgate 12 includes a top wall 15 spaced from the bottom wall 16, including a tailgate first wall 13 spaced from a tailgate second wall 14. The first wall is arranged as an interior wall, with the second wall arranged as an exterior wall of the truck structure. The tailgate includes a tailgate cavity 17 directed orthogonally relative to the top wall and bottom wall and spaced between the first wall and the second wall 13 and 14 respectively. The cavity entrance 18 effects access into the cavity 17 through the top wall 15. A first and second groove 19 and 20 are mounted to an interior of the first wall 13 in confronting relationship relative to the cavity 17. The first and second grooves 19 and 20 slidably mount a respective first and second runner plate 21 and 22 that are arranged in a parallel coextensive relationship relative to one another within the cavity 17, wherein each runner plate 21 and 22 includes respective runner plate first and second ribs 21a and 22a slidably mounted within the respective first and second grooves 19 and 20. The first runner plate 21 includes a first runner plate slot 23 that is in confronting and parallel relationship relative to a second runner plate slot 24 mounted to an interior surface of the second runner plate 22. A first ladder member 25 is slidably mounted to the first and second runner plates, and more specifically to the first and second runner plate slots 23 and 24 by use of respective first and second ladder leg axles 27a and 28a mounted to upper distal ends of the respective first and second ladder legs 27 and 28 of the first ladder member 25 (see FIGS. 5,8 and 9). The first and second ladder legs 27 and 28 include respective first ladder leg member steps 30 orthogonally directed between the first and second ladder legs, and wherein the first and second ladder legs are each of a generally "U" shaped cross-sectional configuration, wherein the cavities of each "U" shaped cross-sectional configuration of the first and second ladder legs are in confronting relationship. Accordingly, the first and second ladder legs 27 and 28 slidably mount respective third and fourth "U" shaped cross-sectional extension legs 31 and 32 that are in a parallel coextensive relationship and form part of the second ladder member 26. Second ladder member steps 33 extend orthogonally between the third and fourth "U" shaped cross-sectional extension legs 31 and 32. The "U" shaped cavities of the third and fourth extension legs 31 and 32 project exteriorly of the second ladder member 26. It may be appreciated that the first and second ladder legs 27 include confronting cavities or slots that cooperate with cavities and slots of the second ladder member 26, and more specifically of the third and fourth extension legs 31 and 32.

At least one latch pin 34 is mounted within the ladder leg 27 cooperative for intersection and engagement with one of a plurality of third extension leg slots 36 formed to a bottom surface of the third extension leg to lock and secure the second ladder member 26 relative to the first ladder member 25.

Figure 6:
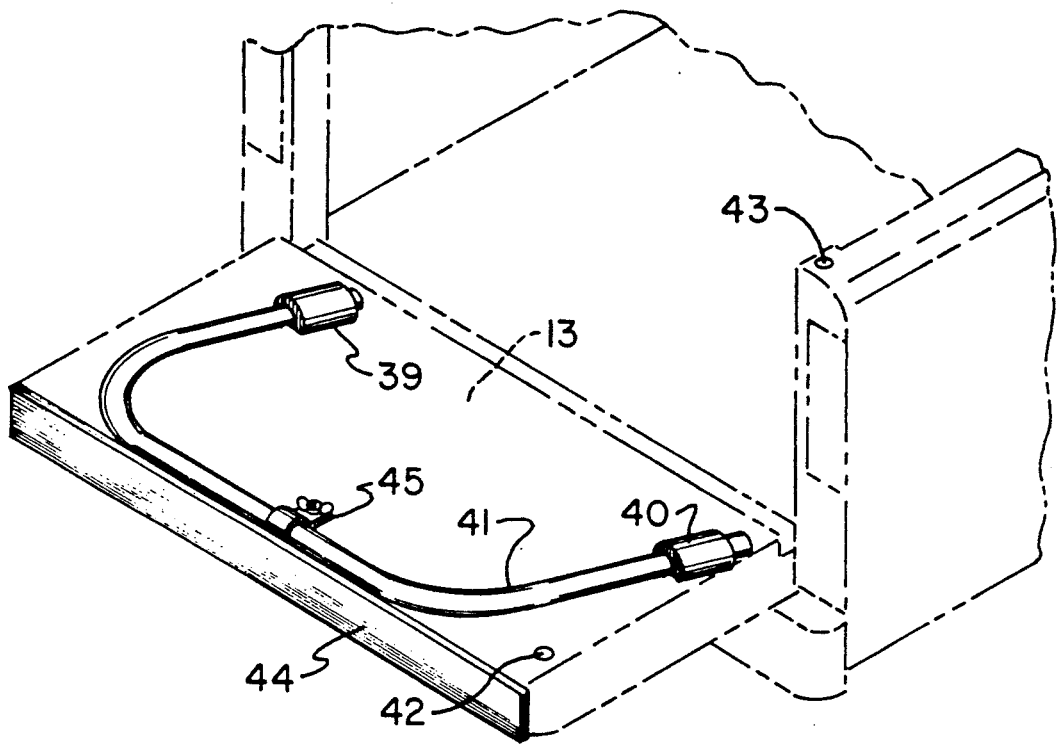
FIG. 6 is an isometric illustration of the tailgate illustrating the handrail mounted to the interior surface of the tailgate.
Figure 7:
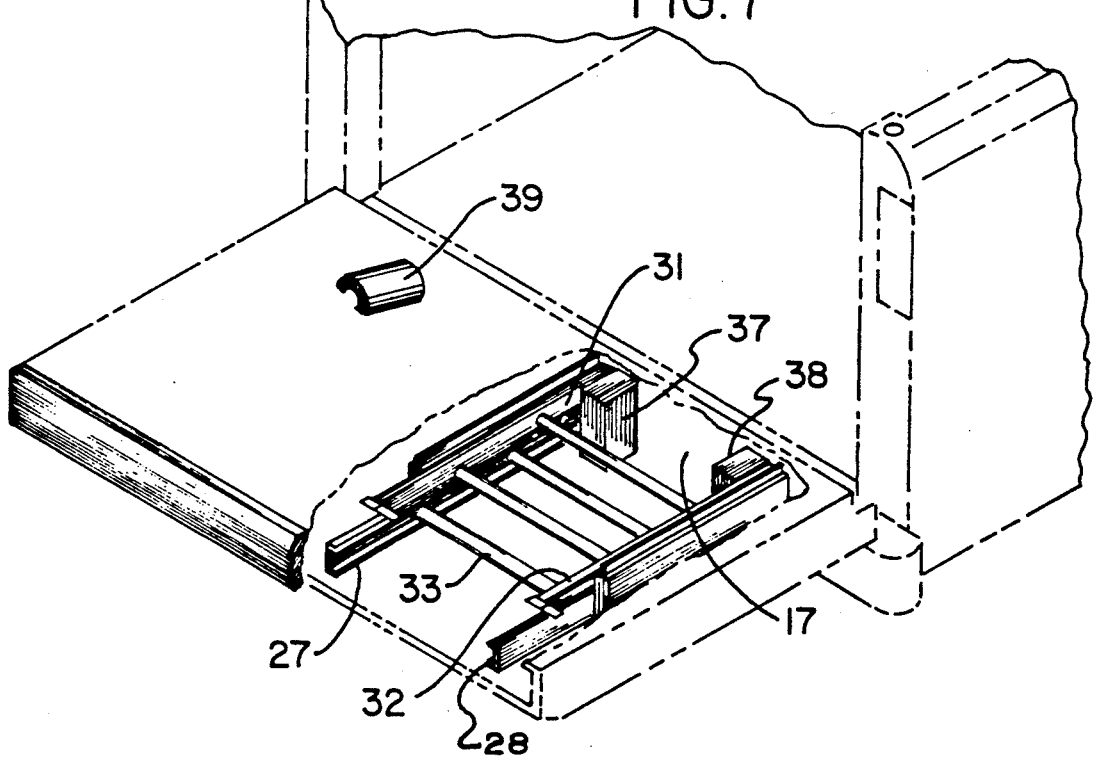
FIG. 7 is an isometric partial sectional view illustrating the tailgate containing the ladder assembly in an inter-folded relationship.

Reference to FIGS. 6 and 7, as well as to the FIG. 8, illustrates the use of a first and second sleeve 39 and 40 mounted to an exterior surface of the first wall 13 to receive the "U" shaped handrail 41 that may be subsequently mounted to the respective first handrail socket 42 within the first wall 13 and simultaneously within the second handrail socket 43 mounted within the tailgate side wall 12.

FIG. 7 illustrates the use of first and second magnetic members 37 and 38 mounted within the cavity 17 positioned adjacent to the respective third and fourth extension legs 31 and 32 to maintain retraction of the ladder assemblies within the cavity 17. A magnetic cover plate 44 (see FIG. 6) is provided to cap and overlie the top wall 15, as well as the associated cavity entrance 18. To further assist in securement of the handrail 41 to the exterior surface of the first wall 13, a latch bracket 45 is mounted securably and selectively to the first wall 13 to engage and maintain the handrail in contiguous communication with the first wall 13.

The FIG. 8 illustrates the use of pneumatic first and second chambers 46 and 47 respectively mounted in surrounding relationship relative to the first and second ladder member steps 30 and 33 to provide for cushioning of the steps in use, with a pneumatic communicating conduit 48 in pneumatic communication with the first and second chambers 46 utilizing a valve 49 mounted at its free distal end for pneumatic association with one of the vehicular tires (not shown) to effect selective inflation of the pneumatic chambers 46 and 47. When not in use, the communicating conduit 48 is wound about a first and second drum 50 and 51 mounted integrally and orthogonally relative to the exterior surface of the first wall 13 between the first and second sleeves 39 and 40.

Figure 11:
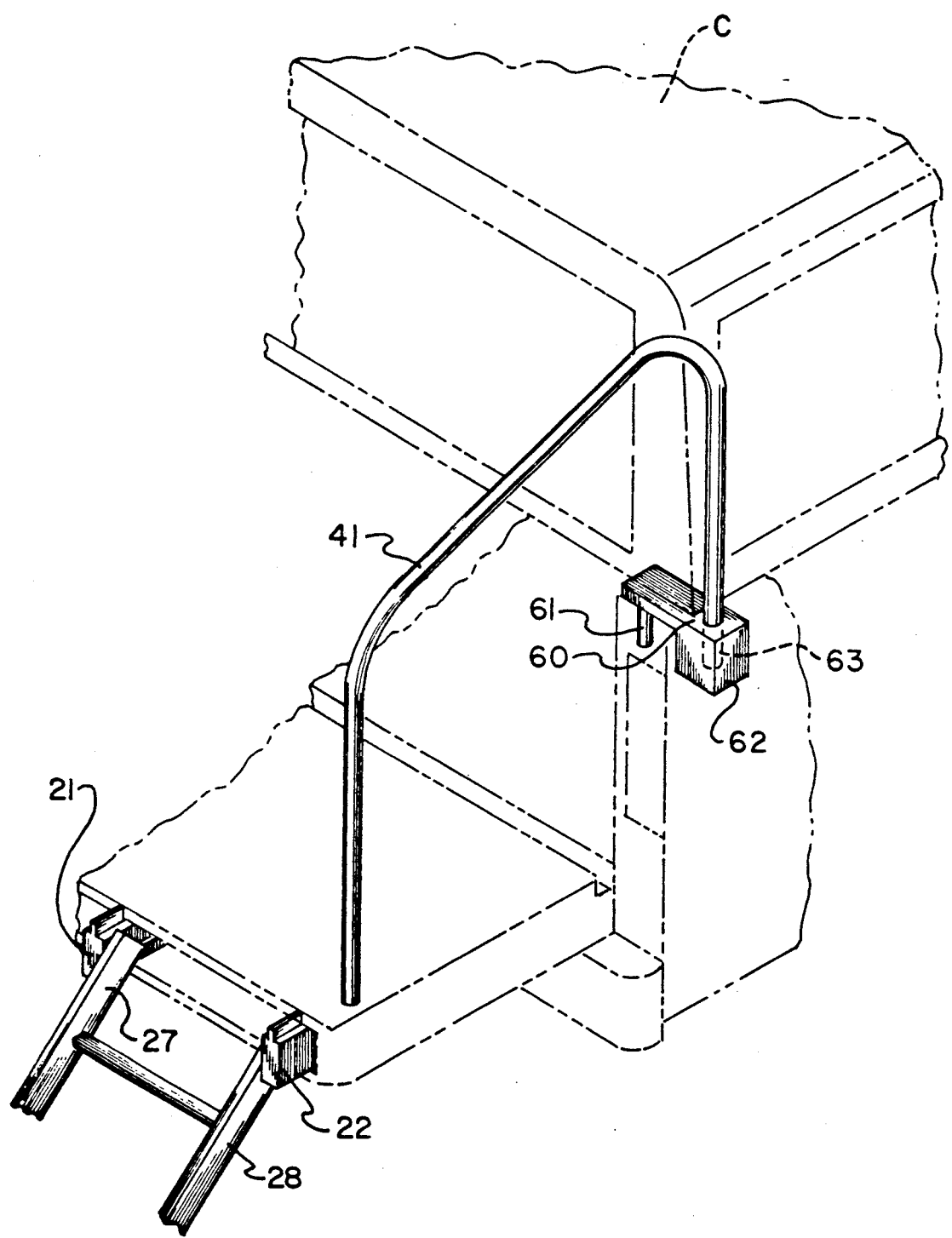
FIG. 11 is an isometric illustration of the organization utilizing a bracket structure to mount the handrail laterally of the truck bed when a camper shell is employed by the truck bed.

A bracket plate 60 is provided, as illustrated in FIG. 11, to include a bracket plate first projection received within the second handrail socket 43, of a type as illustrated in the FIG. 1, with the bracket plate including a support boss 62 mounting a support boss socket 63 to receive the forward end of the handrail therewithin when the truck bed is arranged to mount a camper shell "C", of a type as illustrated in the FIG. 11, to thereby accommodate the handrail structure as well as the camper shell in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A truck tailgate ladder apparatus, comprising,
  a truck bed, wherein the truck bed includes a tailgate pivotally mounted to the truck bed, the tailgate including a tailgate bottom wall pivotally mounted relative to the truck bed, and the tailgate further including a top wall spaced from the bottom wall, and a first wall spaced from a second wall, and
  a tailgate cavity defined within the tailgate extending orthogonally relative to the top wall and the bottom wall oriented between the first wall and the second wall, and the cavity including a cavity entrance directed through the top wall, and
  the first wall including a first groove and a second groove arranged in a parallel coextensive relationship within the first wall interiorly of the cavity, and
  a first runner plate slidably mounted to the first groove, and a second runner plate mounted slidably to the second groove, the first runner plate including a first runner plate rib slidably received within the first groove, and the second runner plate including a second rib slidably received within the second groove, and
  a first ladder member slidably and rotatably mounted to the first runner plate and the second runner plate oriented between the first runner plate and the second runner plate, and
  a second ladder member slidably and rotatably mounted relative to the first ladder member, and latch means to latch the first ladder member relative to the second ladder member.

2. An apparatus as set forth in claim 1 wherein the first runner plate includes a first runner plate slot, the second runner plate includes a second runner plate slot, and the first ladder member includes a first ladder leg and a second ladder leg spaced from, parallel to, and coextensive with the first ladder leg, and the first ladder leg including a first ladder leg axle slidably mounted within the first runner plate slot, and the second ladder leg including a second ladder leg axle slidably mounted within the second runner plate slot, and a plurality of first ladder member steps orthogonally and integrally mounted between the first ladder leg and the second ladder leg.

3. An apparatus as set forth in claim 2 wherein the first ladder leg includes a first slot coextensive therewith, and the second ladder leg includes a second slot coextensive with the second ladder leg, the first slot and the second slot are arranged in a confronting relationship, and wherein the second ladder members includes a third ladder leg spaced from and parallel a fourth ladder leg, the third ladder leg including a third slot, and the fourth ladder leg including a fourth slot, wherein the first slot and the third slot are arranged in a sliding inter-engaging relationship, and the second slot and the fourth slot are arranged in a sliding inter-engaging relationship, and the latch means includes a latch pin mounted to the third ladder leg including a latch pin spring biasing the latch pin exteriorly of the third ladder leg, and the first ladder leg includes a plurality of third leg slots mounted to a bottom surface of the third ladder leg, wherein the latch pin is arranged for selective reception within one of said leg slots.

4. An apparatus as set forth in claim 3 wherein the tailgate cavity includes at least one magnetic member mounted within the cavity, wherein the at least one magnetic member is positioned adjacent the bottom wall within the cavity and adjacent the first ladder member and the second ladder member, wherein the first ladder member and the second ladder member are contained within the tailgate cavity to secure the first ladder member and the second ladder member within the tailgate cavity.

5. An apparatus as set forth in claim 4 including a "U" shaped handrail, and a first sleeve mounted to the first wall and a second sleeve mounted to the first wall spaced from the first sleeve, and the "U" shaped handrail received within the first sleeve and the second sleeve to secure the "U" shaped handrail to the first wall exteriorly of the tailgate cavity, and a first handrail socket mounted within the first wall and a second handrail socket mounted within the truck bed to selectively receive the "U" shaped handrail within the first handrail socket and the second handrail socket for use as a support handrail in ascent and descent of the truck bed by an individual.

6. An apparatus as set forth in claim 5 including a magnetic cover plate selectively securable to the tailgate top wall to overlie the cavity entrance.

7. An apparatus as set forth in claim 6 including a pneumatic first chamber mounted about each first ladder member step and a pneumatic second chamber mounted about each second ladder member step, and a single pneumatic communicating conduit directed between and in pneumatic communication with each first chamber and second chamber, and wherein the communicating conduit includes a conduit valve to direct pneumatic air into the communicating conduit to effect inflation of each first chamber and each second chamber, and a first drum mounted to the first wall and a second drum mounted to the second wall, wherein the first drum and the second drum are mounted between the first sleeve and the second sleeve to receive the communicating conduit in a wound relationship about the first drum and the second drum.

* * * * *